United States Patent

Shibuya et al.

[11] Patent Number: 6,144,907
[45] Date of Patent: Nov. 7, 2000

[54] SUSPENSION FOR CONSTRUCTION MACHINES AND METHOD OF CONTROLLING THE SAME

[75] Inventors: Toshihide Shibuya; Nobuki Hasegawa, both of Oyama, Japan

[73] Assignee: Komatsu Ltd., Tokyo, Japan

[21] Appl. No.: 09/043,030

[22] PCT Filed: Sep. 4, 1996

[86] PCT No.: PCT/JP96/02506

§ 371 Date: May 27, 1998

§ 102(e) Date: May 27, 1998

[87] PCT Pub. No.: WO97/09189

PCT Pub. Date: Mar. 13, 1997

[30] Foreign Application Priority Data

Sep. 7, 1995 [JP] Japan ................................. 7-256811

[51] Int. Cl.[7] ................................................ B01D 35/06
[52] U.S. Cl. ............................ 701/37; 701/38; 285/5.515
[58] Field of Search ................. 701/37, 38; 280/5.515, 280/5.506, 5.512

[56] References Cited

U.S. PATENT DOCUMENTS

| | | | |
|---|---|---|---|
| 4,589,675 | 5/1986 | Braun et al. | 280/707 |
| 4,787,649 | 11/1988 | Watanabe et al. | 280/707 |
| 4,973,077 | 11/1990 | Kuwayama et al. | 280/689 |
| 5,384,706 | 1/1995 | Uchiyama et al. | 701/37 |
| 5,500,798 | 3/1996 | Inagaki | 701/37 |
| 5,515,277 | 5/1996 | Mine | 701/37 |
| 5,562,305 | 10/1996 | Heyring | 280/772 |
| 5,572,425 | 11/1996 | Levitt et al. | 701/37 |
| 5,865,453 | 2/1999 | Harad et al. | 280/124.161 |

FOREIGN PATENT DOCUMENTS

| | | |
|---|---|---|
| 37-14951 | 9/1962 | Japan . |
| 63-46911 | 2/1988 | Japan . |
| 64-56217 | 3/1989 | Japan . |
| 4-46813 | 2/1992 | Japan . |
| 4-100708 | 4/1992 | Japan . |
| 6-40232 | 2/1994 | Japan . |

OTHER PUBLICATIONS

Edition Committee of Automotive Engineering Encyclopedia, "Automotive Engineering Encyclopedia," vol. 11, "Steering, Suspension," Aug. 20, 1980, Sankaido Publishing, pp. 2–7.

Primary Examiner—Tan Nguyen
Attorney, Agent, or Firm—Sidley & Austin

[57] ABSTRACT

A suspension, for use on a construction machine, to provide excellent riding comfort, ease of operation, and stability, and a control method for controlling this suspension. The suspension has front suspension cylinders mounted on the front sides of a vehicle for absorbing a vibration of front-wheel tires, rear suspension cylinders mounted on the rear sides of the vehicle for absorbing vibration of rear-wheel tires, and an accumulator connected to the front suspension cylinders through an electromagnetic change-over valve, the suspension including a vehicle speed sensor (11) for sensing a speed of the vehicle, an electromagnetic change-over valve (6) arranged between the front suspension cylinder and an accumulator (7) and connected to a controller (10), and the controller (10) for outputting, based on a signal received from the vehicle speed sensor (11), an operation signal to the electromagnetic change-over valve (6) such that the front suspension cylinders communicate with the accumulator in order to absorb the vibration of the tires of the vehicle.

20 Claims, 5 Drawing Sheets

SUSPENSION FOR CONSTRUCTION MACHINES AND METHOD OF CONTROLLING THE SAME

TECHNICAL FIELD

The present invention relates to a suspension for use on construction machines and, more particularly, to a hydropneumatic suspension for wide use on off-road dump trucks and rough-terrain cranes and a method of controlling the same.

BACKGROUND ART

In conventional suspensions for use on construction machines, especially, hydropneumatic suspensions for wide use on off-road dump trucks and rough-terrain cranes, the spring constant of each of these suspension is determined by the amount of nitrogen gas, for example, sealed in the suspension. Therefore, the resonance frequency of the suspension is uniquely determined by a load to be sustained. Based on this, one of the spring constant for a flat road and the spring constant for a highly bumpy unprepared land is preset to each construction machine. Consequently, a construction machine set with the spring constant for a flat road cannot efficiently absorb the vibration of resonance frequency, hampering the riding comfort when traveling on a bumpy unprepared land, and vice versa.

Figure 6:
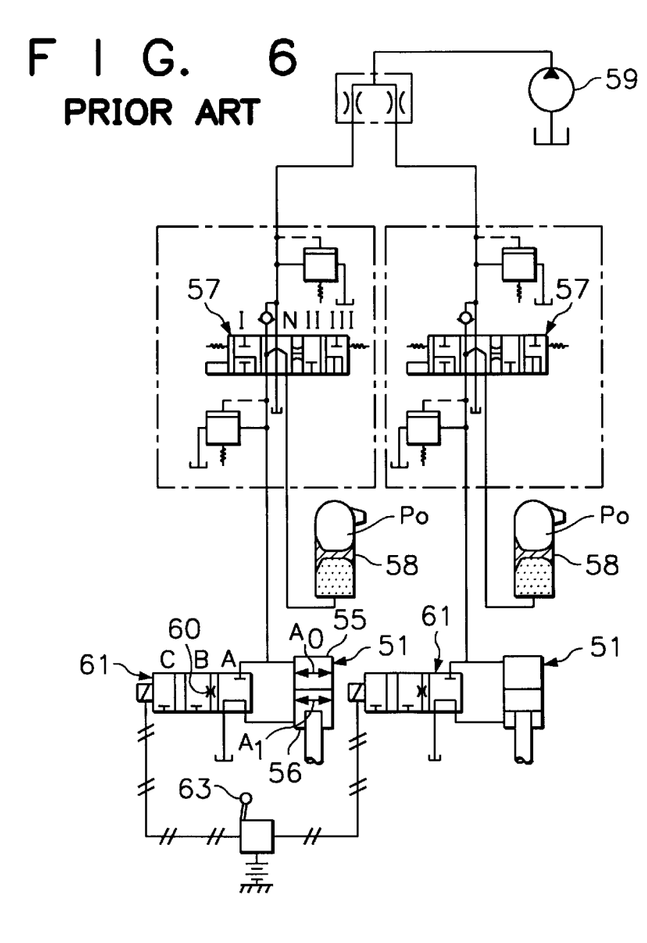
FIG. 6 is a schematic diagram illustrating a prior-art suspension for use on a construction machine.

To solve this problem, a suspension disclosed in Japanese Unexamined Patent Publication No. 1-56217 (published date: 03.03.89) was proposed by the applicant hereof. Disclosed in this publication is a suspension that is mounted on a motor scraper, for example, as shown in FIG. 6. To be more specific, between an up-chamber 56 and a down-chamber 55 of each one of the suspension cylinders 51, 51, a respective one of the spring constant change-over valves 61, 61 is arranged. These spring constant change-over valves 61, 61 are operated by a manual switch 63. Each one of the down-chambers 55 is connected to a respective one of the accumulators 58, 58 through a respective one of the leveling control valves 57, 57. Each one of the accumulators 58, 58 is supplied with pressurized oil, discharged from a pump 59 through a respective one of the leveling control valves 57, 57.

In such a construction, each one of the leveling control valves 57, 57 is set to a neutral position N in a normal traveling mode, to a first position I when the vehicle height is raised, to a third position III when the vehicle height is lowered, and to a second position II when each one of the suspension cylinders 51, 51 is locked. The spring constant of each one of the spring constant change-over valves 61, 61 at its first position A is determined by a pressure receiving area A0 in the down-chamber 55 of the respective one of the suspension cylinders 51, 51 and a gas pressure P0 of the respective one of the accumulators 58, 58. At the third position C, the spring constant is determined by a pressure receiving area A2, which is the difference between the pressure receiving area A0 of the respective down-chamber 55 and a pressure receiving area A1 of the respective up-chamber 56, and the gas pressure P0 of the respective one of the accumulators 58, 58. At the second position B, a pressure difference is caused by a throttle 60, so that the valve of the spring constant is between the valves of the two above-mentioned spring constants.

However, because the change-over operation of each of the spring constant change-over valves 61, 61 is performed by the manual switch 63, an inappropriate operation of this manual switch 63 may select an inappropriate spring constant, thereby deteriorating the riding comfort. Moreover, if the manual switch 63 is operated when there is a difference in pressure between the left and right suspensions at the time of steering, for example, a difference in length is caused between the suspension cylinders 51, 51, thereby lowering the vehicle steerability or stability.

SUMMARY OF INVENTION

It is therefore an object of the present invention to provide an improvement on a hydropneumatic suspension and a method of controlling the same for wide use on off-road trucks and rough-terrain cranes, the improved suspension providing riding comfort over all of the speed range and being excellent in ease of operation and stability, by means of a simple construction.

In carrying out the invention and according to one aspect thereof, there is provided a suspension for use on a construction machine having front suspension cylinders mounted on the front sides of a vehicle for absorbing vibration of the front-wheel tires, rear suspension cylinders mounted on the rear sides of the vehicle for absorbing vibration of the rear-wheel tires, and an accumulator connected to the front suspension cylinders through an electromagnetic change-over valve, the suspension comprising a vehicle speed sensor for sensing a speed of the vehicle, and an electromagnetic change-over valve arranged between the front suspension cylinders and the accumulator and connected to a controller, wherein the controller outputs, based on a signal received from the vehicle speed sensor, an operation signal to the electromagnetic change-over valve such that the front suspension cylinders communicate with the accumulator in order to absorb the vibration of the tires of the vehicle.

In carrying out the invention and according to another aspect thereof, there is provided a suspension for use on a construction machine, wherein the tire has a predetermined spring constant; a suspension cylinder has a cylinder chamber for absorbing the vibration of the tire by an internal pressure varying according to a speed of the vehicle; an electromagnetic change-over valve is connected to the cylinder chamber of the suspension cylinder, to the accumulator, and to the controller; and the controller makes a comparison between the vehicle speed sensed by the vehicle speed sensor and a vehicle speed setting value range which is set from a tire frequency caused by the spring constant of the tire and from a frequency caused by the internal pressure of the suspension cylinder caused according to the speed of the vehicle, adds a volume of the accumulator to the cylinder chamber of the suspension cylinder if the speed is found in the setting value range, and further outputs an operation signal for setting the electromagnetic change-over valve to an open position in order to alter a characteristic frequency of the suspension cylinder. The tire having the predetermined spring constant is a front-wheel tire, and the suspension cylinder for absorbing the vibration of the tire by the controller according to the speed of the vehicle is a front suspension cylinder.

In carrying out the invention and according to still another aspect thereof, there is provided suspension for use on a construction machine, wherein the controller is connected to a steering angle sensor for sensing the steering angle, a brake pressure sensor for sensing a braking operation, an operator lever position sensor for sensing a position to which an operator lever is set, suspension cylinder pressure sensors for sensing oil pressures in the cylinder chambers of the suspension cylinders, and an accumulator pressure sensor for sensing an oil pressure in the accumulator; and the controller, based on inputs from these sensors, compares a steering angle, a braking operation, an operator level position, a pressure difference between the cylinder chambers of the front left, front right, rear left, and rear right suspension cylinders, and a pressure difference between the accumulator and the cylinder chambers of the suspension cylinders with respective setting values to output an operation signal to the electromagnetic change-over valve if these sensed values are all found within the respective setting values.

In carrying out the invention and according to yet another aspect thereof, there is provided a control method for controlling a suspension for use on a construction machine, the suspension having front suspension cylinders mounted on the front sides of a vehicle for absorbing vibration of the front-wheel tires, and rear suspension cylinders mounted on the rear sides of the vehicle for absorbing vibration of rear-wheel tires, the front suspension cylinders being connected to an accumulator through an electromagnetic change-over valve for operating the same; wherein a traveling speed of the vehicle is sensed by a vehicle speed sensor and, if the traveling speed is found by a controller to be within a predetermined setting value range, the controller outputs an operation signal to the electromagnetic change-over valve to communicate the front suspension cylinders with the accumulator, thereby absorbing the vibration of the tires of the vehicle.

In carrying out the invention and according to a different aspect thereof, there is provided a control method for controlling a suspension for use on a construction machine, wherein the controller outputs the operation signal to the electromagnetic change-over valve to communicate a front suspension cylinder with an accumulator, thereby absorbing vibration of a front-wheel tire of the vehicle.

According to the above-mentioned construction, the spring constant of the suspension is determined by the amount of the sealed nitrogen gas, for example. Therefore, in order to prevent the frequencies of the suspension cylinders caused according to the tire frequency and the vehicle speed from matching with each other, the volume of the accumulator is added to the volume of the suspension cylinder, thereby altering the characteristic frequency of the suspension cylinder. To be more specific, if the vehicle traveling speed, detected by the sensor, is found within the predetermined setting value range, the controller outputs the operation signal to the electromagnetic change-over valve to communicate the suspension cylinder with the accumulator. This provides a vehicle that is excellent in riding comfort over all of the speed range, by means of a simple constitution.

Further, controlling only the front-wheel tires facilitates controlling of the vehicle, also retaining stability thereof.

Still further, the steering angle, the braking operation, the operator level setting position, the difference in pressure between the cylinders of the front left, front right, rear left, and rear right suspension cylinders, and the difference in pressure between an accumulator and the cylinder chambers of a suspension cylinder are compared with the respective setting values. If these detected values are all found within the respective setting values, the controller automatically operates the electromagnetic change-over valve, thereby altering the characteristic frequency of each of the suspension cylinders. Consequently, the riding comfort, the ease of operation, and the stability of the vehicle are further enhanced, and there is no need for the operator to operate the electromagnetic change-over valve.

BEST MODE FOR CARRYING OUT THE INVENTION

First, a suspension for use on a construction machine, practiced as a first embodiment of the invention, will be described with reference to FIGS. 1 and 2.

Figure 1:
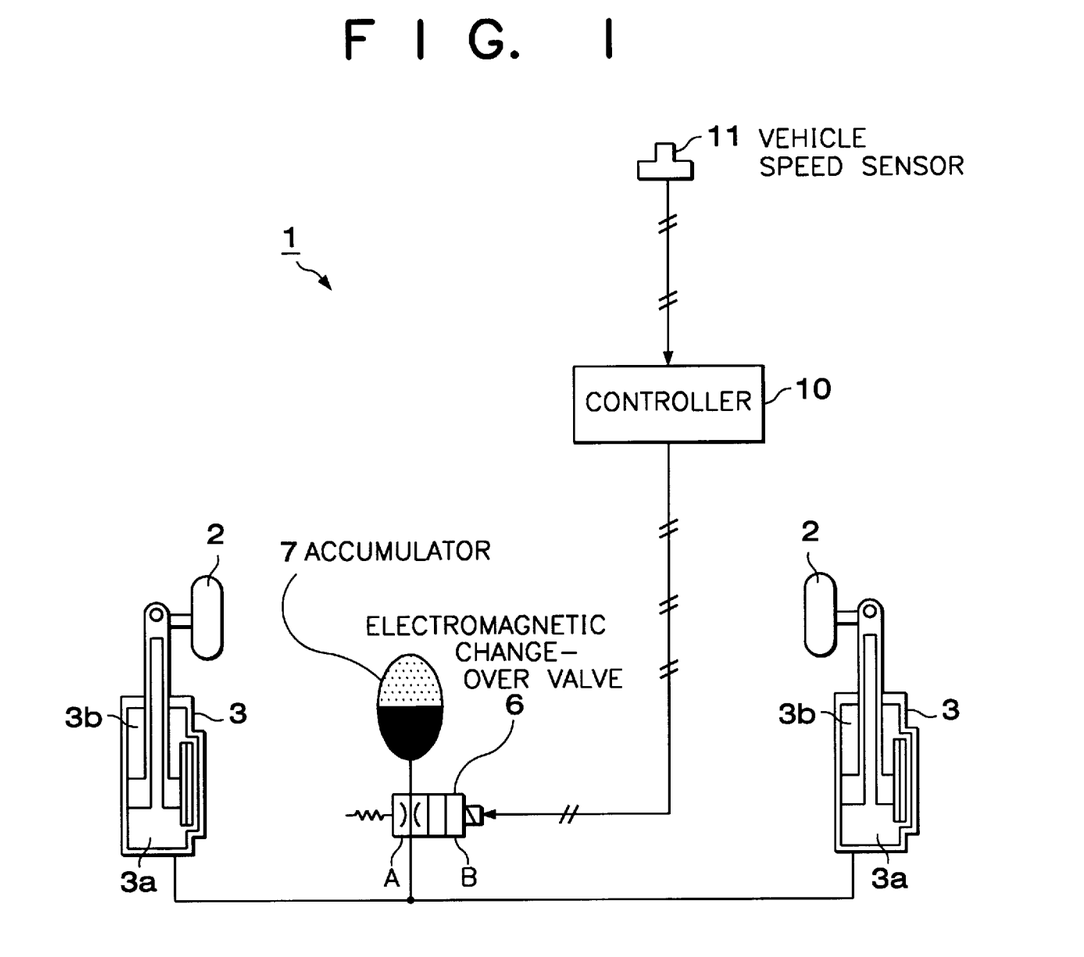
FIG. 1 is a schematic diagram illustrating a suspension for use on a construction machine practiced as a first embodiment of the invention.

In the suspension 1 of the first embodiment, the front-wheel tires 2, 2 are sustained by the front suspension cylinders 3, 3, respectively, on the front sides of a vehicle as shown in FIG. 1. Each of the front suspension cylinders 3, 3 is composed of a cylinder bottom-side chamber 3a on the side for receiving the load of the vehicle and a rod-side chamber 3b for supporting the respective front-wheel tire 2. Each cylinder bottom-side chamber 3a is connected to an accumulator 7 through an electromagnetic change-over valve 6. The electromagnetic change-over valve 6 is constituted by a 2-position valve, the position A thereof is a closed position for blocking the circuit with a large throttle while the position B is an open position for full circuit communication. The electromagnetic change-over valve 6 is connected to a controller 10 to be controlled by the same. At least one of the front-wheel tires 2, 2 is attached with a vehicle speed sensor 11 for measuring the vehicle speed, and a signal outputted from this sensor 11 is supplied to the controller 10.

Figure 2:
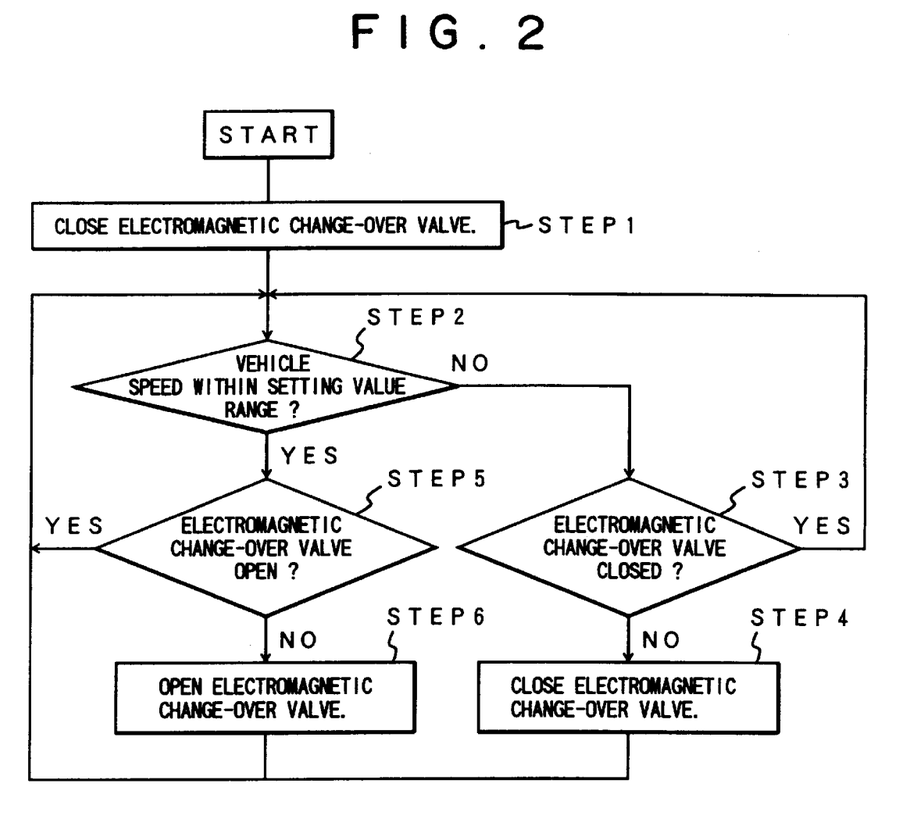
FIG. 2 is a flowchart indicative of an operation of the first embodiment.

The following describes an operation of this embodiment with reference to a flowchart of FIG. 2.

Normally, when the vehicle travels, the electromagnetic change-over valve 6 is closed (step 1). In step 2, it is determined whether or not the vehicle speed has reached a predetermined setting value range in which the spring constant of each of the front-wheel tires 2, 2 and the spring constant of each of the front suspension cylinders 3, 3 cause a resonance. If these spring constants are not found within the predetermined setting value range in step 2, the processing goes to step 3. In step 3, it is determined whether or not the electromagnetic valve 6 is closed. If the electromagnetic change-over valve 6 is found closed in step 3, the processing goes back to step 2. If the electromagnetic change-over valve 6 is found open in step 3, the processing goes to step 4, in which the controller 10 outputs a command for closing the electromagnetic change-over valve 6 and the processing goes back to step 2.

In step 2, if the vehicle speed is found as being within the predetermined setting value range in which resonance is caused, the processing goes to step 5. In step 5 the controller 10 determines whether or not the electromagnetic change-over valve 6 is open. If the electromagnetic change-over valve 6 is found open in step 5, the processing goes back to step 2. Consequently, the volume of the accumulator 7 is added to the cylinder bottom-side chamber 3a of each of the front suspension cylinders 3, 3, there by altering the spring constant of each of the front suspension cylinders 3, 3 such that the spring constant of each of the front-wheel tires 2, 2 and the spring constant of each of the front suspension cylinders 3, 3 do not cause resonance. This construction prevents the resonance at a predetermined vehicle speed from being caused.

If the electromagnetic change-over valve 6 is found closed in step 5, the processing goes to step 6, in which the electromagnetic change-over valve 6 outputs a command for opening the electromagnetic change-over valve 6 and the processing goes back to step 2. This prevents the resonance at a predetermined vehicle speed from being caused as with the case in which the electromagnetic change-over valve 6 is open in step 5.

Meanwhile, when the vehicle travels with no load or a predetermined load, the ratio of the load to act on a suspension cylinder is determined, which in turn determines a pressure to be caused in the suspension cylinder. When the vehicle reaches a predetermined speed, the spring constant of the tire and the spring constant of the suspension cylinder resonate, thereby causing hopping. Especially, because construction machines and the like have a higher tire rigidity than that of ordinary automobiles, the spring constants of the tire and suspension cylinder resonate at any point until a maximum speed is reached, thereby causing hopping. The present embodiment automatically prevents this hopping from being caused, thereby enhancing the riding comfort over all of the speed range.

Figure 3:
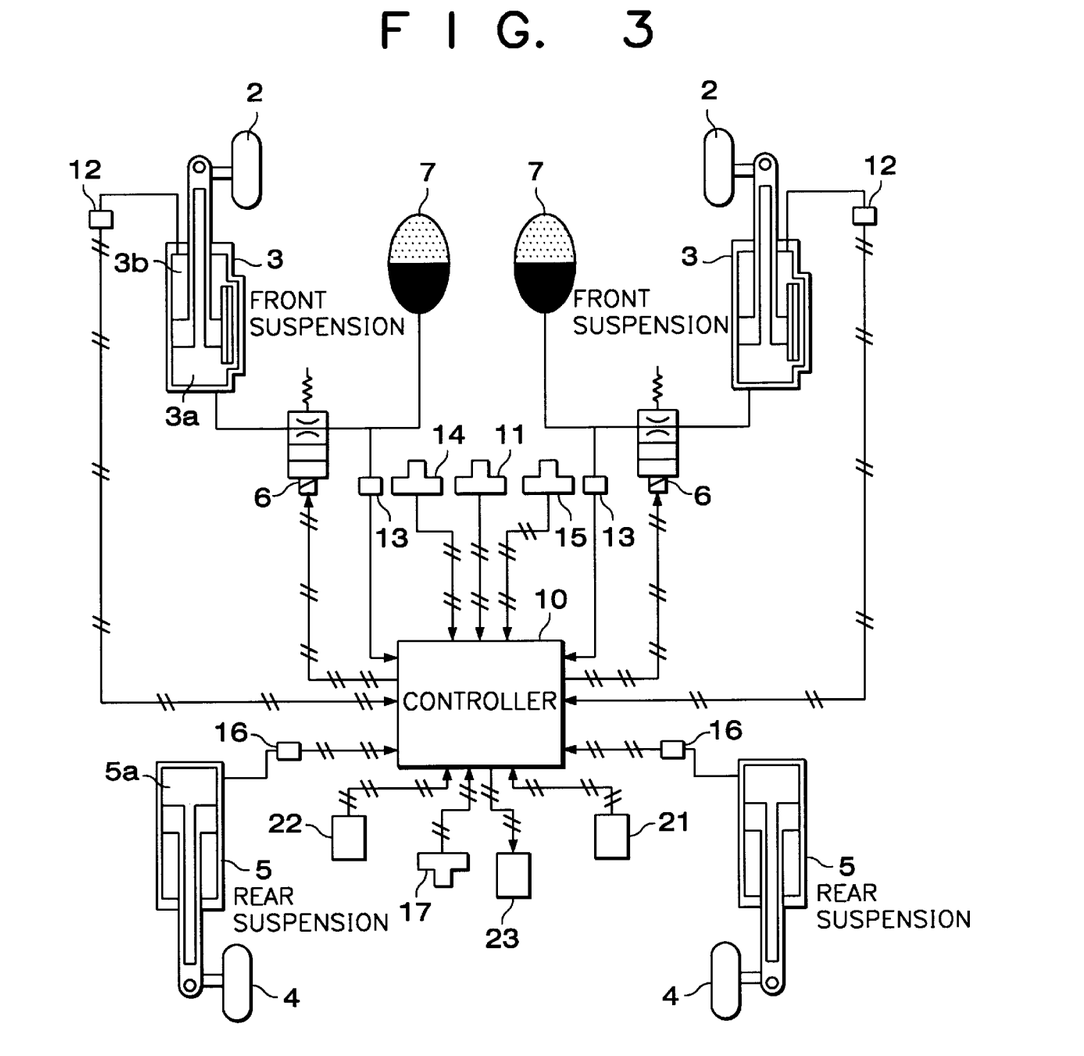
FIG. 3 is a schematic diagram illustrating a suspension for use on a construction machine practiced as a second embodiment of the invention.
Figure 4:
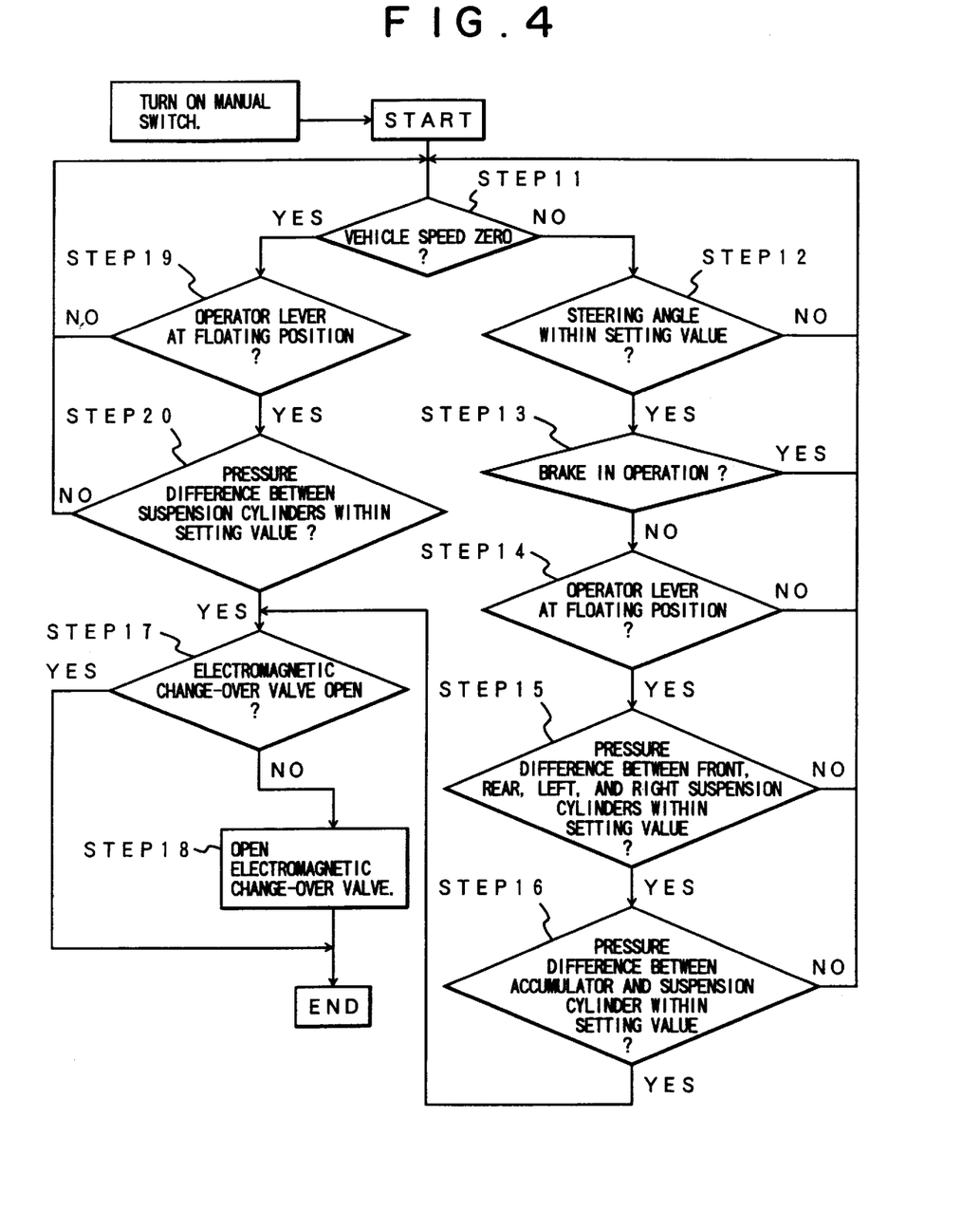
FIG. 4 is a flowchart indicative of an operation of the second embodiment.

The following describes a suspension for use on a construction machine, practiced as a second embodiment of the invention, with reference to FIGS. 3 and 4. With reference to FIGS. 3 and 4, components similar to those previously described with the preceding drawings are denoted by the same reference numerals.

In the second embodiment, the rear-wheel tires 4, 4 are respectively supported by the rear suspension cylinders 5, 5 on the rear sides of a vehicle as shown in FIG. 3. The front suspension cylinders 5, 5, on the front sides of the vehicle, are respectively connected to the accumulators 7, 7 through the electromagnetic change-over valves 6, 6, respectively. Each rod-side chamber 3b of the front suspension cylinders 3, 3 is connected to a respective one of the front suspension cylinder pressure sensors 12, 12, a signal outputted from the same being supplied to the controller 10. Each of the accumulators 7, 7 is connected to a respective one of the accumulator pressure sensors 13, 13, a signal outputted from the same also being supplied to the controller 10. Further, a steering device (not shown) is connected to a steering angle sensor 14 for measuring a steering angle. A brake device (not shown) is connected to a brake pressure sensor 15 for sensing a braking operation. Signals outputted from these sensors are also supplied to the controller 10.

The controller 10 is also connected to the suspension cylinder pressure sensors 16, 16, each of which is attached to the cylinder bottom-side chamber 5a of a respective one of the rear suspension cylinders 5, 5. An operator lever (not shown), for operating a vessel for carrying earth, is connected to an operator lever position sensor 17, and the operator lever position sensor 17 is connected to the controller 10. Further, the controller 10 is connected to a main switch 21, a manual switch 22, and an indicator 23 for telling operations of this suspension.

The above-mentioned construction prevents hopping from being caused by resonance, further enhancing the riding comfort over all of the speed range. When various states of the vehicle are stabilized, the electromagnetic change-over valves 6, 6 are automatically switched by the controller 10, thereby enhancing the ease of operation and the stability of the vehicle. It should be noted that this control can also be performed by the manual switch 22.

The following describes an operation of this embodiment with reference to the flowchart of FIG. 4.

First, after turning on the main switch 21, the operator turns on the manual switch 22 to prevent resonance from being caused. When various states of the vehicle have been checked by the controller 10 in the following steps, the electromagnetic change-over valves 6, 6 are actually switched.

In step 11, it is determined by the signal coming from the vehicle speed sensor 11 whether or not the vehicle speed is zero. If the vehicle speed is found as being other than zero in step 11, namely if the vehicle is traveling, the processing goes to step 12.

In step 12, it is determined by the signal coming from the steering angle sensor 14 whether or not the steering angle is within the setting value. If the steering angle is found as being over the setting value, namely the steering wheel is in operation, the electromagnetic change-over valves 6, 6 are not switched but are kept at their open position (position A) and the processing goes back to step 11. If the steering angle is found as being within the setting value in step 12, the processing goes to step 13, in which it is determined by the signal coming from the brake pressure sensor 15 whether or not the brake is in operation.

If the brake is found as being in operation in step 13, the electromagnetic change-over valves 6, 6 are not switched but are kept at their closed position (position A) and the processing goes back to step 11. If the brake is found not to be in operation in step 13, the processing goes to step 14, in which it is determined by the signal coming from the operator lever position sensor 17 whether or not the operator lever is at the floating position.

If the operator lever is found not as being at the floating position in step 14, namely the operating valve for operating the vessel (not shown) is at its up, down, or neutral-position, the electromagnetic change-over valves 6, 6 are not switched but are kept at their closed position (position A) and the processing goes back to step 11. If the operator lever is found as being at the floating position in step 14, namely the operating valve is at the floating position and the vessel can move up and down freely, the processing goes to step 15.

In step 15, it is determined by the front suspension cylinder pressure sensors 12, 12 and the rear suspension cylinder pressure sensors 16, 16 whether the difference in pressure between the front left, the front right, the rear left and the rear right suspension cylinders 3, 3 and 5, 5 is within the setting value. If the difference in pressure between the front left, the front right, the rear left, and the rear right suspension cylinders 3, 3 and 5, 5 is found as being over the setting values, the electromagnetic change-over valves 6, 6 are not switched but are kept at their closed position (position A) and the processing goes back to step 11. If the difference in pressure between the front left, the front right, the rear left, and the rear right suspension cylinders 3, 3 and 5, 5 is found as being within the setting value, namely no eccentric load is acting on the vehicle, the processing goes to step 16.

In step 16, it is determined by the signals coming from the accumulator pressure sensors 13, 13 and the front suspension cylinder pressure sensors 12, 12 whether the difference in pressure between each one of the front suspension cylinders 3, 3 and a respective one of the accumulators 7, 7 is within the setting value range. If the difference in pressure between each one of the front suspension cylinders 3, 3 and the respective one of the accumulators 7, 7 is found as being over the setting value range, the electromagnetic change-over valves 6, 6 are not switched but are kept at their closed position (position A) and the processing goes back to step 11. If the difference in pressure between each one of the front suspension cylinders 3, 3 and the respective one of the accumulators 7, 7 is found as being within the setting value range, the processing goes to step 17.

In step 17, it is determined whether or not each of the electromagnetic change-over valves 6, 6 is at its open position. If each of the electromagnetic change-over valves 6, 6 is found being at its closed position, the processing goes to step 18, in which the controller 10 issues a command to each of the electromagnetic change-over valves 6, 6 to move to the open position. Thus, each of the electromagnetic change-over valves 6, 6 is set at its open position.

On the other hand, if the velocity speed is found as being zero in step 11, namely the velocity is in a standstill state, the processing goes to step 19. In step 19, it is determined by the signal coming from the operator lever position sensor 17 whether or not the operator level is at the floating position.

If the operator lever is found not to be at the floating position in step 19, namely the vessel (not shown) is at its up, down, or neutral position, each of the electromagnetic change-over valves 6, 6 is not switched but is kept at its closed position (position A), and the processing goes back to step 11. If the operator lever is found to be at the floating position in step 19, namely the operating valve is set to the floating position and therefore the vessel can move upwardly and downwardly freely, the processing goes to step 20.

In step 20, it is determined by the signals coming from each of the front suspension cylinder pressure sensors 12, 12 and each of the rear suspension cylinder pressure sensors 16, 16 whether or not the difference in pressure between the front left, the front right, the rear left and the rear right suspension cylinders 3, 3 and 5, 5 is over the setting value. If the difference in pressure between the front left, the front right, the rear left, and the rear right suspension cylinders 3, 3 and 5, 5 is found as being over the setting value in step 20, each of the electromagnetic change-over valves 6, 6 is not switched but is kept at its closed position (position A), and the processing goes back to step 11. If the difference in pressure between the front left, the front right, the rear left, and the rear right suspension cylinders 3, 3 and 5, 5 is found as being within the setting value, namely no eccentric load is acting on the vehicle, the processing goes to step 17. In step 17, the same decision as mentioned above for step 5 is performed, and therefore the description will be skipped.

The steps in which the various states of the vehicle are checked by the controller 20 are summarized as follows.

When the vehicle is traveling, the following checks are performed and then each of the electromagnetic changeover valves 6, 6 is switched:

(1) the steering angle is within the setting value;
(2) the brake is not operating;
(3) the operator lever is set to the floating position;
(4) the difference in pressure between the front left, the front right, the rear left, and the rear right suspension cylinders is within the setting value; and
(5) the difference in pressure between each of the front suspension cylinders 3, 3 and the respective one of the accumulators 7, 7 is within the setting value.

On the other hand, when the vehicle is in the standstill state, the following checks are performed and then each of the electromagnetic change-over valves 6, 6 is actually switched:

(6) the operator lever is set to the floating position; and
(7) the difference in pressure between the front left, the front right, the rear left, and the rear right suspension cylinders 3, 3 and 5, 5 is within the setting value.

Figure 5:
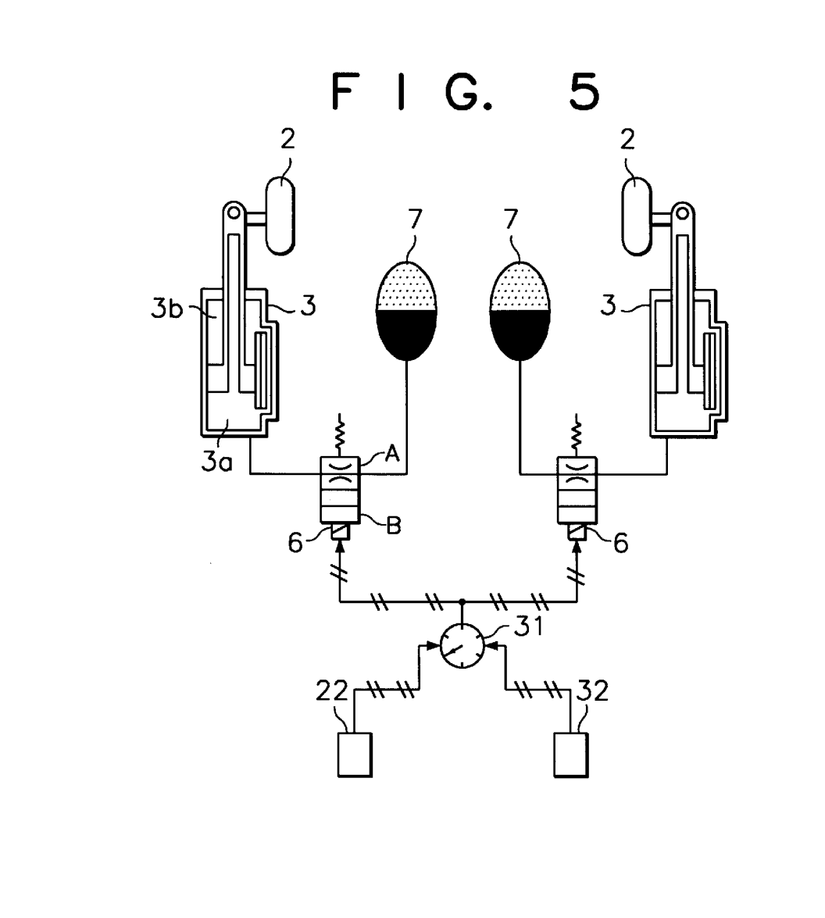
FIG. 5 is a schematic diagram illustrating a suspension for use on a construction machine associated with an example of application of the invention.

The following describes an example of an application of the present invention with reference to FIG. 5. With reference to FIG. 5, components similar to those previously described with the preceding drawings are denoted by the same reference numerals.

The left and right suspension cylinders 3, 3 are connected to the accumulators 7, 7 through the electromagnetic change-over valves 6, 6 respectively.

Each of the electromagnetic change-over valves 6, 6 is a 2-position valve, the position A thereof is the closed position for blocking the circuit with a large throttle, while the position B is for the open position for full circuit communication. Each of the electromagnetic change-over valves 6, 6 is connected to a timer switch 31. The timer switch 31 is connected to a manual switch 22 and a reset switch 32.

The following describes operations of this application example.

When a vehicle such as a construction machine travels, the spring constant of the tires and the spring constant of the suspension cylinders resonate at a predetermined speed, causing hopping. To prevent hopping from occurring, each of the electromagnetic change-over valves 6, 6 moves to its position B for full circuit communication, thereby opening the circuit.

This control is performed when the operator determines, from the state of the vehicle, for example the speed at which the vehicle is traveling, to switch each of the electromagnetic change-over valves 6, 6, and turns on the manual switch 22. Each one of the electromagnetic change-over valves 6, 6 immediately moves to its position B to communicate each one of the front suspension cylinders 3, 3 with the respective one of the accumulators 7, 7. When a predetermined time passes after the manual switch 22 has been turned on, the timer switch 31 outputs a signal to each of the electromagnetic change-over valves 6, 6 to return each of the electromagnetic change-over valves 6, 6 to its position A, closing the circuit. Thus, there is no risk that the operator forgets the switching.

If it is necessary to return each of the electromagnetic change-over valves 6, 6 to its position A before the predetermined time passes, the operator turns ON the reset switch 32. A signal is immediately outputted from the timer switch 31 to each of the electromagnetic change-over valves 6, 6, returning each of the electromagnetic change-over valves 6, 6, closing the circuit. This puts the vehicle into the normal suspension state.

The advantages of the suspension according to the present invention are summarized as follows. In order to prevent the suspension cylinder frequency from matching the tire frequency, each electromagnetic change-over valve 6 is operated by the signal, for example outputted from the vehicle speed sensor 11, to alter the characteristic frequency of each of the suspension cylinders 3, 3 by the pressure from the respective accumulator 7. This simple construction provides a construction machine which is excellent in riding comfort over all of the speed range.

Further, based on the difference in pressure between the suspension cylinders 3, 3 and 5, 5, the electromagnetic change-over valves 6, 6 are automatically switched by the controller 10 when the various states of the vehicle are stabilized. Consequently, the riding comfort, the ease of operation, and the stability of the vehicle are further enhanced. At the same time, there is no risk that the operator forgets the switching. In addition, the control of only the front-wheel tires 2, 2 facilitates control of the vehicle and, at the same time, does not deteriorate the stability.

Industrial Applicability

As described, the present invention relates to a hydropneumatic suspension for wide use on off-road dump trucks, rough-terrain cranes, and the like, and is useful for a suspension for use on a construction machine which is excellent in riding comfort, ease of operation, and stability over all of the speed ranges of the construction machine by means of a simple construction, and for a method of controlling this suspension.

What is claimed is:

1. Apparatus comprising:
   a construction machine vehicle having a left front tire, a right front tire, a left rear tire, and a right rear tire, each of said tires having a spring constant;
   a left front suspension cylinder mounted on a left front side of said vehicle; said left front suspension cylinder having a cylinder chamber for absorbing vibration of said left front tire by an internal pressure of the cylinder chamber of said left front suspension cylinder;
   a right front suspension cylinder mounted on a right front side of said vehicle, said right front suspension cylinder having a cylinder chamber for absorbing vibration of said right front tire by an internal pressure of the cylinder chamber of said right front suspension cylinder;
   at least one change-over valve;
   at least one accumulator, each accumulator being connected through one of said at least one change-over valve to at least one of said left front suspension cylinder and said right front suspension cylinder;
   a vehicle speed sensor for sensing a speed of said vehicle and providing a speed signal responsive thereto; and
   a controller for receiving said speed signal, for comparing a vehicle speed, as represented by said speed signal, with a vehicle speed setting range, and for actuating said at least one change-over valve to provide fluid communication between each one of said left front suspension cylinder and said right front suspension cylinder and one of said at least one accumulator if said vehicle speed is within said vehicle speed setting range, thereby altering a characteristic frequency of each of said left front suspension cylinder and said right front suspension cylinder.

2. Apparatus in accordance with claim 1, wherein said vehicle speed setting range is set from a tire frequency caused by the spring constant of each of said left front tire, said right front tire, said left rear tire, and said right rear tire, and from a frequency caused by an internal pressure of a cylinder chamber of each of said left front suspension cylinder and said right front suspension cylinder according to said vehicle speed.

3. Apparatus in accordance with claim 1, wherein, if said controller determines that said vehicle speed is over said vehicle speed setting range, said controller then determines whether or not said at least one change-over valve is closed and closes said at least one change-over valve if said controller determines that said at least one change-over valve is open when said vehicle speed is over said vehicle speed setting range.

4. Apparatus in accordance with claim 1, further comprising:
   a left rear suspension cylinder mounted on a left rear side of said vehicle; said left rear suspension cylinder having a cylinder chamber for absorbing vibration of said left rear tire by an internal pressure of the cylinder chamber of said left rear suspension cylinder; and
   a right rear suspension cylinder mounted on a right rear side of said vehicle; said right rear suspension cylinder having a cylinder chamber for absorbing vibration of said right rear tire by an internal pressure of the cylinder chamber of said right rear suspension cylinder.

5. Apparatus in accordance with claim 4, wherein said vehicle speed setting range is set from a tire frequency caused by a spring constant of each of said left front tire, said right front tire, said left rear tire, and said right rear tire, and from a frequency caused by an internal pressure of a cylinder chamber of each of said left front suspension cylinder, said right front suspension cylinder, said left rear suspension cylinder, and said right rear suspension cylinder according to said vehicle speed.

6. Apparatus in accordance with claim 5, wherein only said left front suspension cylinder and said right front suspension cylinder are connected through a change-over valve to an accumulator.

7. Apparatus in accordance with claim 1, wherein said at least one accumulator is a common accumulator, and wherein said at least one change-over valve is a single change-over valve which connects a cylinder chamber of said left front suspension cylinder and a cylinder chamber of said right front suspension cylinder to said common accumulator.

8. Apparatus in accordance with claim 7, wherein said single change-over valve is an electromagnetic change-over valve having an open position for full fluid communication and a closed position, which includes a throttle.

9. Apparatus in accordance with claim 1, wherein said at least one accumulator comprises at least a left front accumulator and a right front accumulator, and wherein said at least one change-over valve comprises a left change-over valve which connects a cylinder chamber of said left front suspension cylinder to said left front accumulator, and a right change-over valve which connects a cylinder chamber of said right front suspension cylinder to said right front accumulator.

10. Apparatus in accordance with claim 9, wherein each change-over valve is an electromagnetic change-over valve having an open position for full fluid communication and a closed position, which includes a throttle.

11. Apparatus in accordance with claim 9, further comprising:
    a left rear suspension cylinder mounted on a left rear side of said vehicle; said left rear suspension cylinder having a cylinder chamber for absorbing vibration of said left rear tire by an internal pressure of the cylinder chamber of said left rear suspension cylinder; and
    a right rear suspension cylinder mounted on a right rear side of said vehicle; said right rear suspension cylinder having a cylinder chamber for absorbing vibration of said right rear tire by an internal pressure of the cylinder chamber of said right rear suspension cylinder.

12. Apparatus in accordance with claim 11, further comprising:
    a first pressure sensor for sensing pressure in the cylinder chamber of said left front suspension cylinder and for outputting a first signal representative thereof to said controller;

a second pressure sensor for sensing pressure in the cylinder chamber of said right front suspension cylinder and for outputting a second signal representative thereof to said controller;

a third pressure sensor for sensing pressure in the cylinder chamber of said left rear suspension cylinder and for outputting a third signal representative thereof to said controller;

a fourth pressure sensor for sensing pressure in the cylinder chamber of said right rear suspension cylinder and for outputting a fourth signal representative thereof to said controller;

a left accumulator pressure sensor for sensing a pressure in said left accumulator and for outputting a fifth signal representative thereof to said controller; and a right accumulator pressure sensor for sensing a pressure in said right accumulator and for outputting a sixth signal representative thereof to said controller;

wherein said controller, based on said first, second, third, fourth, fifth, and sixth signals, outputs an operation signal to each of said left change-over valve and said right change-over valve.

13. Apparatus in accordance with claim 11, further comprising:

a first pressure sensor for sensing pressure in the cylinder chamber of said left front suspension cylinder and for outputting a first signal representative thereof to said controller;

a second pressure sensor for sensing pressure in the cylinder chamber of said right front suspension cylinder and for outputting a second signal representative thereof to said controller;

a third pressure sensor for sensing pressure in the cylinder chamber of said left rear suspension cylinder and for outputting a third signal representative thereof to said controller;

a fourth pressure sensor for sensing pressure in the cylinder chamber of said right rear suspension cylinder and for outputting a fourth signal representative thereof to said controller;

a left accumulator pressure sensor for sensing a pressure in said left accumulator and for outputting a fifth signal representative thereof to said controller; and a right accumulator pressure sensor for sensing a pressure in said right accumulator and for outputting a sixth signal representative thereof to said controller;

a steering angle sensor for sensing a steering angle and for outputting a seventh signal representative thereof to said controller;

a brake pressure sensor for sensing a braking operation and for outputting an eighth signal representative thereof to said controller; and an operator lever position sensor for sensing a position to which an operator lever is set and for outputting a ninth signal representative thereof to said controller; and wherein said controller, based on said first, second, third, fourth, fifth, sixth, seventh, eighth, and ninth signals, compares a steering angle, a braking operation, an operator lever position, a pressure difference between the cylinder chambers of the left front suspension cylinder, the right front suspension cylinder, the left rear suspension cylinder, and the right rear suspension cylinder, and a pressure difference between the left and right accumulators and the cylinder chambers of the left front suspension cylinder and the right front suspension cylinder with respective setting values, and further outputs an operation signal to each of said left change-over valve and said right change-over valve if these sensed values are all found as being within said respective setting values.

14. Apparatus in accordance with claim 1, further comprising:

a timer connected to said at least one change-over valve;

a manual switch for activating said timer; and a reset switch for resetting said timer.

15. A control method for controlling a suspension on a construction machine vehicle having a left front tire, a right front tire, a left rear tire, and a right rear tire, each of said tires having a predetermined spring constant, said suspension having:

a left front suspension cylinder mounted on a left front side of said vehicle; said left front suspension cylinder having a cylinder chamber for absorbing vibration of said left front tire by an internal pressure of the cylinder chamber of said left front suspension cylinder;

a right front suspension cylinder mounted on a right front side of said vehicle; said right front suspension cylinder having a cylinder chamber for absorbing vibration of said right front tire by an internal pressure of the cylinder chamber of said right front suspension cylinder;

at least one change-over valve;

at least one accumulator, each accumulator being connected through one of said at least one change-over valve to at least one of said left front suspension cylinder and said right front suspension cylinder; and a vehicle speed sensor for sensing a speed of said vehicle;

said method comprising the steps of:

comparing a vehicle speed, sensed by said vehicle speed sensor, with a vehicle speed setting value range, and actuating said at least one change-over valve to provide fluid communication between each of said left front suspension cylinder and said right front suspension cylinder and said at least one accumulator if said vehicle speed is found to be within said vehicle speed setting value range, to thereby alter a characteristic frequency of each of said left front suspension cylinder and said right front suspension cylinder.

16. A method in accordance with claim 15, further comprising the step of:

setting said vehicle speed setting range from a tire frequency caused by a spring constant of each of said left front tire, said right front tire, said left rear tire, and said right rear tire, and from a frequency caused by an internal pressure of a cylinder chamber of each of said left front suspension cylinder and said right front suspension cylinder according to said vehicle speed.

17. A method in accordance with claim 15, further comprising the step of:

if said vehicle speed is over said vehicle speed setting range, determining whether or not said at least one change-over valve is closed; and closing said at least one change-over valve if said at least one change-over valve is open when said vehicle speed is over said vehicle speed setting range.

18. A method in accordance with claim 15, further comprising the steps of:

sensing pressure in the cylinder chamber of said left front suspension cylinder and outputting a first signal representative thereof;

sensing pressure in the cylinder chamber of said right front suspension cylinder and outputting a second signal representative thereof;

sensing pressure in the cylinder chamber of said left rear suspension cylinder and outputting a third signal representative thereof;

sensing pressure in the cylinder chamber of said right rear suspension cylinder and outputting a fourth signal representative thereof;

sensing a pressure in said left accumulator and outputting a fifth signal representative thereof; and sensing a pressure in said right accumulator and outputting a sixth signal representative thereof; and wherein said step actuating said at least one change-over valve comprises actuating each of said left change-over valve and said right change-over valve responsive to said first, second, third, fourth, fifth, and sixth signals.

19. A method in accordance with claim 15, further comprising the steps of:

sensing pressure in the cylinder chamber of said left front suspension cylinder and outputting a first signal representative thereof;

sensing pressure in the cylinder chamber of said right front suspension cylinder and outputting a second signal representative thereof;

sensing pressure in the cylinder chamber of said left rear suspension cylinder and outputting a third signal representative thereof;

sensing pressure in the cylinder chamber of said right rear suspension cylinder and outputting a fourth signal representative thereof;

sensing a pressure in said left accumulator and outputting a fifth signal representative thereof;

sensing a pressure in said right accumulator and outputting a sixth signal representative thereof;

sensing a steering angle and outputting a seventh signal representative thereof;

sensing a braking operation and outputting an eighth signal representative thereof;

sensing a position to which an operator lever is set and outputting a ninth signal representative thereof;

determining, in any order:
 whether or not the vehicle speed is zero;
 whether said operator lever is in a floating position;
 whether a pressure difference between the suspension cylinders is within a setting value;
 whether said at least one change-over valve is open; and if said vehicle speed is zero, said operator lever is at a floating position, said pressure difference between the suspension cylinders is within its setting value, and said at least one change-over valve is closed, then opening said at least one change-over valve.

20. A method in accordance with claim 15, further comprising the steps of:

sensing pressure in the cylinder chamber of said left front suspension cylinder and outputting a first signal representative thereof;

sensing pressure in the cylinder chamber of said right front suspension cylinder and outputting a second signal representative thereof;

sensing pressure in the cylinder chamber of said left rear suspension cylinder and outputting a third signal representative thereof;

sensing pressure in the cylinder chamber of said right rear suspension cylinder and outputting a fourth signal representative thereof;

sensing a pressure in said left accumulator and outputting a fifth signal representative thereof;

sensing a pressure in said right accumulator and outputting a sixth signal representative thereof;

sensing a steering angle and outputting a seventh signal representative thereof;

sensing a braking operation and outputting an eighth signal representative thereof;

sensing a position to which an operator lever is set and outputting a ninth signal representative thereof;

determining, in any order:
 whether or not said vehicle speed is zero;
 whether said steering angle is within its setting value;
 whether or not a brake is in operation;
 whether said operator lever is in a floating position;
 whether a pressure difference between the suspension cylinders is within a setting value therefor;
 whether a pressure difference between an accumulator and an associated suspension cylinder is within a setting value therefor;
 whether said at least one change-over valve is open; and if said vehicle speed is not zero, said steering angle is within its setting value, said brake is not in operation, said operation lever is at a floating position, a pressure difference between the suspension cylinders is within the setting value therefor, a pressure difference between an accumulator and an associated suspension cylinder is within the setting value therefor, and said at least one change-over valve is determined to be closed, then opening said at least one change-over valve.

* * * * *